United States Patent
Clark et al.

(10) Patent No.: US 10,895,286 B2
(45) Date of Patent: Jan. 19, 2021

(54) POLYGONAL SPRING COUPLING

(71) Applicant: Bendix Commercial Vehicle Systems, LLC, Elyria, OH (US)

(72) Inventors: Sean J. Clark, Canandaigua, NY (US); David D. Colavincenzo, Castalia, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 16/846,641

(22) Filed: Apr. 13, 2020

(65) Prior Publication Data
US 2020/0240474 A1    Jul. 30, 2020

Related U.S. Application Data

(63) Continuation-in-part of application No. 16/008,679, filed on Jun. 14, 2018, now Pat. No. 10,663,006.

(51) Int. Cl.
*F16D 3/12* (2006.01)
*F02B 63/04* (2006.01)
(Continued)

(52) U.S. Cl.
CPC .................. *F16D 3/12* (2013.01); *F01P 5/04* (2013.01); *F01P 5/10* (2013.01); *F02B 63/042* (2013.01);
(Continued)

(58) Field of Classification Search
CPC .......... F16D 3/12; F02B 63/042; F02B 67/06; H02K 7/006
See application file for complete search history.

(56) References Cited

U.S. PATENT DOCUMENTS 2,928,286 A    3/1960 Davis
4,006,993 A    2/1977 Woerlee
(Continued)

FOREIGN PATENT DOCUMENTS

CN    101000972 B    5/2011
CN    203685448 U    7/2014
(Continued)

OTHER PUBLICATIONS

R. Bao et al., "Using Pneumatic Hybrid Technology to Reduce Fuel Consumption and Eliminate Turbo-Lag", SAE International, Apr. 8, 2013 (twelve (12) pages).
(Continued)

*Primary Examiner* — Derek D Knight
(74) *Attorney, Agent, or Firm* — Crowell & Moring LLP

(57) ABSTRACT

A polygonal coupling couples torque source to a torque consumer such that input and output portions of the coupling may elastically rotate relative to one another during torque transfer to accommodate rotational speed variations in delivery of torque from the torque source. In an embodiment the torque source is an internal combustion engine with an integrated switchable coupling between the engine crankshaft and a torque transfer segment supporting a motor-generator. The polygonal coupling includes axially-overlapping polygonal-shaped male and female portions which cooperate to pass torque between the output of the integrated switchable coupling and an input of the torque transfer segment. At least one of the male and female portions includes recesses which form flexible arms adjacent to the lobes of the polygonal shape that allow the portions to rotate relative to one another over small angular displacements, and thereby improve damping of crankshaft rotational vibrations.

17 Claims, 12 Drawing Sheets

(51) Int. Cl.
  *F01P 5/10* (2006.01)
  *F01P 5/04* (2006.01)
(52) U.S. Cl.
  CPC .............. *F16D 2200/0021* (2013.01); *F16D 2200/0034* (2013.01); *F16D 2200/0056* (2013.01)

(56) References Cited

U.S. PATENT DOCUMENTS

| | | |
|---|---|---|
| 4,288,998 A | 9/1981 | Schnur et al. |
| 4,426,585 A | 1/1984 | Bigalke |
| 4,736,112 A | 4/1988 | Yabunaka |
| 4,782,932 A | 11/1988 | Janson |
| 5,035,296 A | 7/1991 | Sjostrand |
| 5,221,232 A | 6/1993 | Nameny |
| 5,322,149 A | 6/1994 | Szadkowski |
| 5,611,416 A | 3/1997 | Berger et al. |
| 5,755,622 A | 5/1998 | Kanki et al. |
| 5,810,669 A | 9/1998 | Dorr |
| 5,856,709 A | 1/1999 | Ibaraki et al. |
| 5,931,380 A | 8/1999 | Aoki et al. |
| 6,018,199 A | 1/2000 | Shiroyama et al. |
| 6,026,921 A | 2/2000 | Aoyama et al. |
| 6,082,316 A | 7/2000 | Ban et al. |
| 6,193,040 B1 | 2/2001 | Cerny |
| 6,254,507 B1 | 7/2001 | Downs |
| 6,306,057 B1 | 10/2001 | Morisawa et al. |
| 6,367,570 B1 | 4/2002 | Long, III et al. |
| 6,396,165 B1 | 5/2002 | Nagano et al. |
| 6,555,927 B1 | 4/2003 | Suzuki et al. |
| 6,781,252 B2 | 8/2004 | Berels |
| 7,114,585 B2 | 10/2006 | Man et al. |
| 7,419,021 B2 | 9/2008 | Morrow et al. |
| 7,462,970 B2 | 12/2008 | Hoff et al. |
| 7,537,410 B2 | 5/2009 | Parisi et al. |
| 7,558,666 B2 | 7/2009 | Digonis |
| 7,753,147 B2 | 7/2010 | Usoro |
| 7,886,709 B2 | 2/2011 | Riedel et al. |
| 7,954,580 B2 | 6/2011 | Usoro |
| 8,166,945 B2 | 5/2012 | Spicer et al. |
| 8,272,463 B2 | 9/2012 | Kovach et al. |
| 8,327,990 B2 | 12/2012 | Friedman |
| 8,408,175 B2 | 4/2013 | Schoenek et al. |
| 8,423,214 B2 | 4/2013 | Kshatriya |
| 8,480,006 B2 | 7/2013 | Sanger et al. |
| 8,500,590 B2 | 8/2013 | Showalter |
| 8,512,007 B2 | 8/2013 | Hebrard |
| 8,561,588 B2 | 10/2013 | Reynolds et al. |
| 8,596,391 B2 | 12/2013 | Kshatriya |
| 8,606,450 B2 | 12/2013 | Holmes et al. |
| 8,718,848 B2 | 5/2014 | Pfefferl et al. |
| 8,753,762 B2 | 6/2014 | Major et al. |
| 8,776,929 B2 | 7/2014 | West et al. |
| 8,807,314 B2 | 8/2014 | Hebrard |
| 8,808,124 B2 | 8/2014 | Major et al. |
| 8,833,324 B2 | 9/2014 | O'Brien et al. |
| 8,840,523 B2 | 9/2014 | Tajima |
| 8,939,240 B2 | 1/2015 | Wehrwein et al. |
| 9,051,911 B2 | 6/2015 | Staley |
| 9,108,633 B1 | 8/2015 | Atluri et al. |
| 9,108,635 B2 | 8/2015 | Miyazaki et al. |
| 9,296,157 B1 | 3/2016 | Handschuh et al. |
| 9,358,968 B2 | 6/2016 | Nedorezov et al. |
| 9,421,964 B2 | 8/2016 | Ideshio et al. |
| 9,452,672 B2 | 9/2016 | Namuduri et al. |
| 10,112,603 B2 | 10/2018 | Colavincenzo et al. |
| 10,220,830 B2 | 3/2019 | Colavincenzo et al. |
| 10,220,831 B2 | 3/2019 | Colavincenzo et al. |
| 10,308,240 B2 | 6/2019 | Colavincenzo et al. |
| 10,343,677 B2 | 7/2019 | Colavincenzo et al. |
| 10,363,923 B2 | 7/2019 | Colavincenzo et al. |
| 10,479,180 B2 | 11/2019 | Colavincenzo et al. |
| 10,486,690 B2 | 11/2019 | Colavincenzo et al. |
| 2002/0020875 A1 | 2/2002 | Arao et al. |
| 2002/0107101 A1 | 8/2002 | Bowen et al. |
| 2002/0108373 A1 | 8/2002 | Frey |
| 2003/0062770 A1 | 4/2003 | Sasaki et al. |
| 2003/0116368 A1 | 6/2003 | Winkelman et al. |
| 2006/0030450 A1 | 2/2006 | Kyle |
| 2006/0283683 A1 | 12/2006 | Miller |
| 2007/0169970 A1 | 7/2007 | Kydd |
| 2008/0110683 A1 | 5/2008 | Serkh |
| 2008/0179119 A1 | 7/2008 | Grenn et al. |
| 2008/0217083 A1 | 9/2008 | Serkh et al. |
| 2009/0048747 A1 | 2/2009 | Stridsberg |
| 2009/0101465 A1 | 4/2009 | Hart et al. |
| 2009/0114463 A1 | 5/2009 | Devault |
| 2009/0139789 A1 | 6/2009 | Yang |
| 2009/0166113 A1 | 7/2009 | Luo et al. |
| 2009/0294191 A1 | 12/2009 | Sheidler et al. |
| 2010/0056327 A1 | 3/2010 | Hofbauer |
| 2010/0094513 A1 | 4/2010 | Mair |
| 2010/0158702 A1 | 6/2010 | Colavincenzo |
| 2010/0269920 A1 | 10/2010 | Henning |
| 2011/0015812 A1 | 1/2011 | Vogel |
| 2011/0233020 A1 | 9/2011 | Tajima |
| 2011/0259189 A1 | 10/2011 | Diekmeyer et al. |
| 2011/0319214 A1 | 12/2011 | Showalter |
| 2012/0136547 A1 | 5/2012 | Miyazaki et al. |
| 2012/0225751 A1 | 9/2012 | Andreae et al. |
| 2012/0285292 A1 | 11/2012 | Barnes |
| 2012/0303196 A1 | 11/2012 | Kieser et al. |
| 2012/0316713 A1 | 12/2012 | Pfefferl et al. |
| 2013/0053199 A1 | 2/2013 | Thompson |
| 2013/0166118 A1 | 6/2013 | Kim |
| 2013/0204472 A1 | 8/2013 | Pfefferl |
| 2013/0204490 A1 | 8/2013 | Pfefferl et al. |
| 2014/0206494 A1 | 7/2014 | Geis-Esser et al. |
| 2014/0249730 A1 | 9/2014 | Hilberer |
| 2014/0265331 A1 | 9/2014 | Creviston |
| 2015/0038288 A1 | 2/2015 | Holmes et al. |
| 2015/0073675 A1 | 3/2015 | Malone et al. |
| 2015/0101789 A1 | 4/2015 | Enomoto et al. |
| 2015/0135742 A1 | 5/2015 | Rousseau et al. |
| 2015/0283997 A1 | 10/2015 | Wang et al. |
| 2015/0285312 A1 | 10/2015 | Williams et al. |
| 2015/0285317 A1 | 10/2015 | Lannutti |
| 2015/0369300 A1 | 12/2015 | Biermann et al. |
| 2016/0001649 A1 | 1/2016 | Benjey |
| 2016/0052383 A1 | 2/2016 | Caron |
| 2016/0082946 A1 | 3/2016 | Kodawara |
| 2016/0091070 A1 | 3/2016 | Park et al. |
| 2016/0097328 A1 | 4/2016 | Wintgens et al. |
| 2016/0101770 A1 | 4/2016 | Yamazaki et al. |
| 2016/0167499 A1 | 6/2016 | Holmes et al. |
| 2016/0193991 A1 | 7/2016 | Apelsmeier |
| 2016/0244050 A1 | 8/2016 | Ouchi et al. |
| 2016/0248129 A1 | 8/2016 | Dunham et al. |
| 2016/0258409 A1 | 9/2016 | Marthaler et al. |
| 2016/0280212 A1 | 9/2016 | Lian et al. |
| 2016/0280213 A1 | 9/2016 | Lian et al. |
| 2018/0162355 A1 | 6/2018 | Colavincenzo et al. |
| 2018/0162377 A1 | 6/2018 | Colavincenzo et al. |

FOREIGN PATENT DOCUMENTS

| | | |
|---|---|---|
| CN | 102723535 B | 7/2015 |
| CN | 105196859 A | 12/2015 |
| CN | 105604758 A | 5/2016 |
| CN | 105752082 A | 7/2016 |
| DE | 100 60 003 A1 | 6/2002 |
| DE | 10 2005 024 359 A1 | 11/2006 |
| DE | 10 2006 028 286 A1 | 12/2007 |
| DE | 20 2006 020 383 U1 | 7/2008 |
| DE | 10 2012 013 334 A1 | 1/2014 |
| DE | 10 2015 203 045 A1 | 8/2015 |
| DE | 10 2011 121 790 B4 | 10/2016 |
| EP | 0 098 777 A2 | 1/1984 |
| EP | 0 773 381 A2 | 5/1997 |
| EP | 2 221 226 B1 | 1/2012 |
| FR | 2 995 014 B1 | 9/2014 |
| GB | 414481 A | 8/1934 |
| GB | 562171 A | 6/1944 |
| GB | 564215 A | 9/1944 |

(56) References Cited

FOREIGN PATENT DOCUMENTS

| GB | 2523080 A | 8/2015 |
|---|---|---|
| JP | 2007-246030 A | 9/2007 |
| JP | 2012-111267 A | 6/2012 |
| JP | 2016-098748 A | 5/2016 |
| KR | 10-1620210 | 5/2016 |
| WO | WO 2012/085294 A1 | 6/2012 |
| WO | WO 2013/152386 A1 | 10/2013 |
| WO | WO 2015/019085 A2 | 2/2015 |

OTHER PUBLICATIONS

International Search Report (PCT/ISA/220 & PCT/ISA/210) issued in PCT Application No. PCT/US2017/060553 dated Jan. 18, 2018 (three (3) pages).
Written Opinion (PCT/ISA/237) issued in PCT Application No. PCT/US2017/060553 dated Jan. 18, 2018 (ten (10) pages).
International Search Report (PCT/ISA/220 & PCT/ISA/210) issued in PCT Application No. PCT/US2017/061041 dated Jan. 5, 2018 (six (6) pages).
Written Opinion (PCT/ISA/237) issued in PCT Application No. PCT/US2017/061041 dated Jan. 5, 2018 (three (3) pages).
International Search Report (PCT/ISA/220 & PCT/ISA/210) issued in PCT Application No. PCT/US2017/061672 dated Jan. 23, 2018 (three (3) pages).
Written Opinion (PCT/ISA/237) issued in PCT Application No. PCT/US2017/061672 dated Jan. 23, 2018 (four (4) pages).
International Search Report (PCT/ISA/220 & PCT/ISA/210) issued in PCT Application No. PCT/US2017/060975 dated Jan. 23, 2018 (three (3) pages).
Written Opinion (PCT/ISA/237) issued in PCT Application No. PCT/US2017/060975 dated Jan. 23, 2018 (four (4) pages).
International Search Report (PCT/ISA/210) issued in PCT Application No. PCT/US2017/062520 dated Jan. 19, 2018 (three (3) pages).
Written Opinion (PCT/ISA/237) issued in PCT Application No. PCT/US2017/062520 dated Jan. 19, 2018 (four (4) pages).
International Search Report (PCT/ISA/210) issued in PCT Application No. PCT/US2017/061265 dated Jan. 26, 2018 (three (3) pages).
Written Opinion (PCT/ISA/237) issued in PCT Application No. PCT/US2017/061265 dated Jan. 26, 2018 (seven (7) pages).
International Search Report (PCT/ISA/210) issued in PCT Application No. PCT/US2017/062018 dated Jan. 30, 2018 (three (3) pages).
Written Opinion (PCT/ISA/237) issued in PCT Application No. PCT/US2017/062018 dated Jan. 30, 2018 (six (6) pages).
International Search Report (PCT/ISA/210) issued in PCT Application No. PCT/US17/60737 dated Feb. 1, 2018 (four (4) pages).
Written Opinion (PCT/ISA/237) issued in PCT Application No. PCT/US17/60737 dated Feb. 1, 2018 (five (5) pages).
International Search Report issued in PCT Application No. PCT/US17/62457 dated Feb. 2, 2018 (four (4) pages).
Written Opinion (PCT/ISA/237) issued in PCT Application No. PCT/US17/62457 dated Feb. 2, 2018 (five (5) pages).
International Search Report (PCT/ISA/210) issued in PCT Application No. PCT/US17/65276 dated Feb. 23, 2018 (three (3) pages).
Written Opinion (PCT/ISA/237) issued in PCT Application No. PCT/US17/65276 dated Feb. 23, 2018 (four (4) pages).
Cummins Engines, Features and Parameters, http://cumminsengines.com/powerspec-isx-fan-control-features-and-parameters, 2015, (two (2) pages).
Horton, Lesson 3: Fan Drive Control System, 2004 (four (4) pages).
Logan Front Mount PTO's for Caterpillar C6.6 and C4.4 Diesel Engines and Generator Sets, Logan Clutch Corporation, 2011 (two (2) pages).
International Search Report (PCT/ISA/220 & PCT/ISA/210) issued in PCT Application No. PCT/US19/30917 dated Jul. 22, 2019 (three pages).
Written Opinion (PCT/ISA/237) issued in PCT Application No. PCT/US19/30917 dated Jul. 22, 2019 (11 pages).

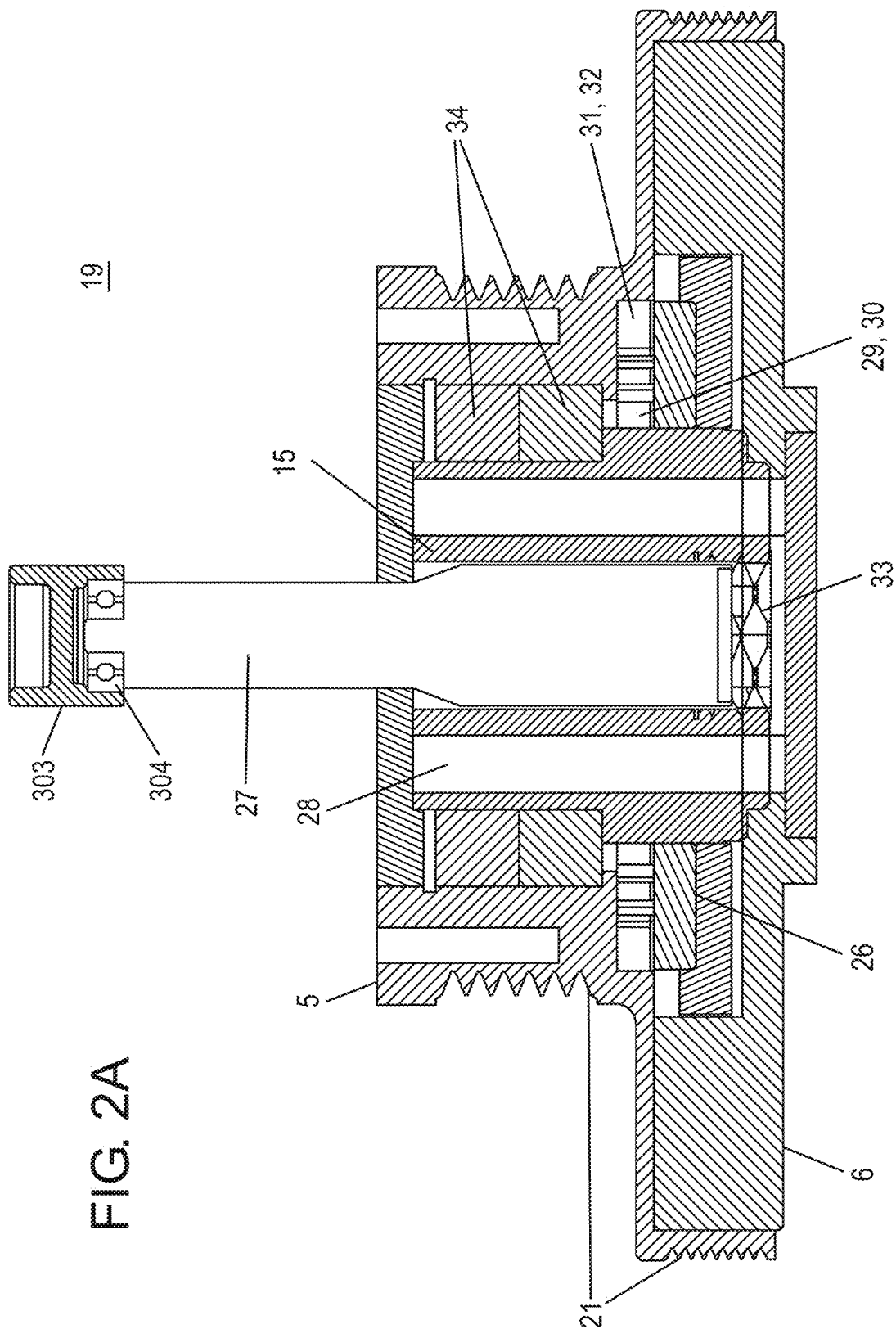

Fig. 6A
Fig. 6B
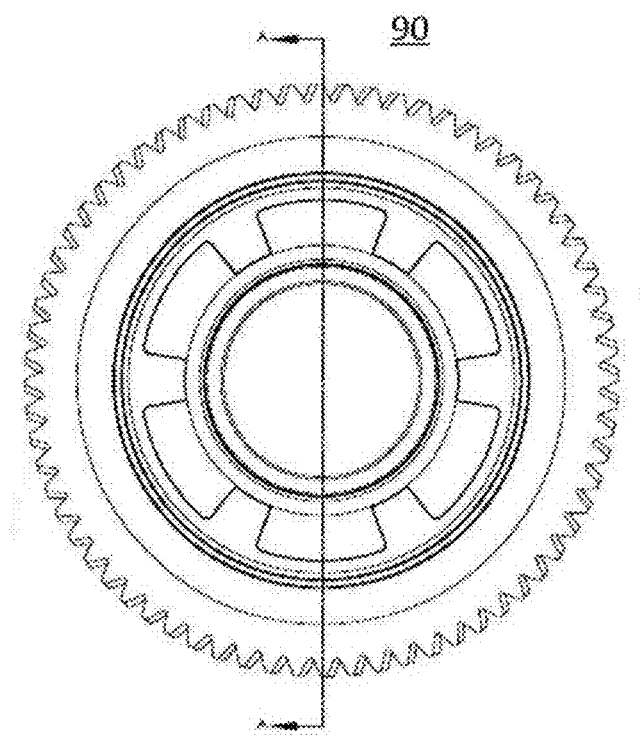
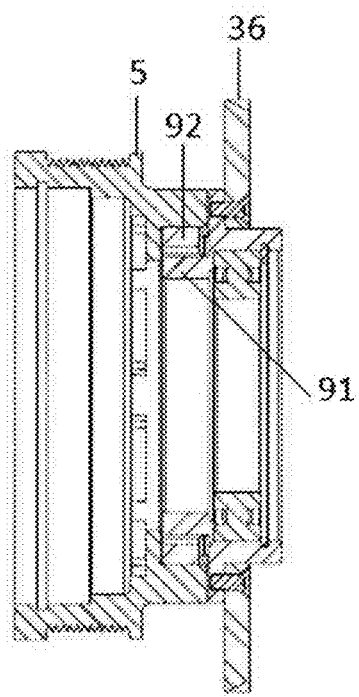

POLYGONAL SPRING COUPLING

This application is a continuation-in-part application claiming priority to U.S. application Ser. No. 16/008,679, filed Jun. 14, 2018.

The present invention relates to couplings across which torque is transferred, in particular to a coupling for use in a variety of industrial applications, such as in a hybrid electric generating and storage system associated with an internal combustion engine.

BACKGROUND OF THE INVENTION

Hybrid electric vehicles having an internal combustion engine combined with a motor-generator and an electrical energy storage system have been the focus of considerable attention in the automotive field, particularly in the field of passenger vehicles. Development of hybrid electric vehicle systems has only recently begun to attract significant interest in commercial and off-road vehicles, e.g., trucks and busses in Vehicle Classes 2-8, in earth-moving equipment and railroad applications, and in stationary internal combustion engine-powered installations.

U.S. patent application Ser. No. 15/378,139, assigned to the present Applicant and incorporated by reference in full herein, discloses a novel approach to providing the benefits of hybrid electric technologies in which a hybrid electric vehicle system is located at a front end of an engine, with a motor-generator being arranged in a manner that requires little or no extension of the length of the front of the vehicle. This system is referred to as a front end motor-generator or "FEMG" system.

As used in this description, the "front end" of the engine is the end opposite the end from which engine-generated torque output is transferred to the primary torque consumers, such as a vehicle's transmission and drive axles or a stationary engine installation's load, such as a pump drive. Typically, the rear end of an engine is where the engine's flywheel is located, and the front end is where components such as engine-driven accessories are located (e.g., air conditioning and compressed air compressors, engine cooling fans, coolant pumps, power steering pumps).

In this front end motor-generator system, the motor-generator is located in the front region of the engine, laterally offset to the side of the rotation axis of the engine crankshaft, and is supported on a torque transfer segment (also referred to as a "drive unit") between the motor-generator and the region immediately in front of the front end of the engine's crankshaft. The torque transfer segment may take the form of a narrow-depth parallel shaft gearbox arranged with its input rotation axis co-axial with the engine crankshaft.

An important feature of the front end generator system is that the motor-generator exchanges torque with the engine crankshaft via the torque transfer segment and a switchable coupling (i.e., disengageable) between the torque transfer segment and the front end of the crankshaft. The switchable coupling includes an engine-side portion coupled directly to the engine crankshaft, a drive portion engageable with the engine-side portion to transfer torque therebetween, and an engagement device, preferably an axially-actuated clutch between the drive portion and the engine-side portion. The engine-side portion of the coupling includes a crankshaft vibration damper (hereafter, a "damper"), unlike a conventional crankshaft damper that traditionally has been a separate element fixed to the crankshaft as a dedicated crankshaft vibration suppression device. This arrangement enables transfer of torque between the accessory drive, the motor-generator and the engine in a flexible manner, for example, having the accessory drive being driven by different torque sources (e.g., the engine and/or the motor-generator), having the engine being the source of torque to drive the motor-generator as an electric generator, and/or having the motor-generator coupled to the engine and operated as a motor to act as a supplemental vehicle propulsion torque source.

Particularly preferably, the switchable coupling is an integrated clutch-pulley-damper unit having the clutch between the engine side damper portion and the drive portion. The drive side portion includes a drive flange configured to be coupled to the engine-end of the torque transfer segment, the drive flange also including one or more drive pulley sections on its outer circumference. This preferred configuration also has all three of the pulley, clutch and damper arranged concentrically, with at least two of these elements partially overlapping one another along their rotation axis. This arrangement results in a disengageable coupling with a greatly minimized axial depth to facilitate FEMG mounting in the space-constrained environment in front of an engine. The axial depth of the coupling may be further minimized by reducing the axial depth of the clutch, pulley and damper to a point at which the drive pulley extends concentrically around all or at least substantially all of the clutch and the engine-side damper portion of the coupling.

Alternatively, one or more of the three clutch, pulley and damper portions may be arranged co-axially with, but not axially overlapping the other portions as needed to suit the particular front end arrangements of engines from different engine suppliers. For example, in an engine application in which a belt drive is not aligned with the damper (i.e., the damper does not have belt-driving grooves about its outer circumference, such as in some Cummins® engine arrangements), the belt-driving surface of the pulley portion of the coupling need not axially overlap the damper. In other applications having belt drive surfaces on the outer circumference of the damper and a further belt drive surface on a pulley mounted in front of the damper, such as in some Detroit Diesel® engines, the coupling that would be used in place of the original damper and pulley may be arranged with both belt drive surfaces on a pulley that extends axially over the damper (i.e., the damper axially overlaps substantially all of both the damper and the clutch), or with a belt drive surface on the outer circumference of the damper, for example, to drive engine accessories that are never disconnected from the crankshaft, such as an engine coolant pump, while another other belt drive surface is located on the pulley member that extends axially over the clutch.

Previously, crankshaft dampers were typically designed with an outer portion, typically a concentric ring, resiliently connected to an inner hub of the damper directly mounted on the front end of the crankshaft. Such dampers were designed such that the inertia of the outer portion would permit the outer portion to concentrically oscillate about the inner hub at a frequency that effectively matched and offset crankshaft rotation vibrations (i.e., small angular irregularities in the crankshaft's rotation caused by "micro" accelerations and decelerations of the crankshaft associated with individual force pulses applied to the crankshaft, e.g., individual cylinder combustion events, individual cylinder compression stroke resistance, etc.). Left unaddressed, these crankshaft rotational speed oscillations can cause significant damage to the engine's internal components.

The addition of a switchable coupling, such as the clutch-pulley-damper unit disclosed in application Ser. No. 15/378, 139, to the front end of a crankshaft has the potential to alter the torsional stiffness seen by the crankshaft when the switchable coupling is closed and the torque transfer segment is thereby coupled to the crankshaft. When so coupled, the torque transfer segment gear train and the attached motor-generator may present the crankshaft with increased inertia which can impact the natural frequency of the mass elastic system. The result can be less effective damping of the crankshaft vibrations than desired.

The present invention provides a switchable coupling which addresses this problem by including a resilient portion in the clutch-pulley-damper unit that effectively isolates much of the additional inertia of the torque transfer segment and motor-generator from the engine crankshaft.

Preferably, at the point at which the drive input to the torque transfer segment is coupled to the output of the switchable coupling (in the clutch-pulley-damper unit and gearbox in application Ser. No. 15/378,139, via a male-female spline connection), a polygonal-shaped coupling is provided, with at least one of the male and female polygonal portions having area in which additional flexibility is incorporated. For example, on the male side of a triangular polygonal coupling, near each of the three corners a slot (or other geometry) may be provided that allows each corner to slightly flex when loaded by angular vibration pulses from the crankshaft. Such an arrangement would allow the male portion of the torque transfer segment-to-switchable coupling arrangement to rotate slightly relative to the female portion in response to the crankshaft vibrations. The present invention is not limited to a slot configuration, but may use any aperture geometry the provides the desired amount of resilient response to crankshaft acceleration/deceleration pulses.

With the present invention's the use of a polygonal drive arrangement with vibration-absorbing features, the crankshaft is effectively isolated from the inertia of the torque transfer segment and motor-generator by the vibration-absorbing features. The clutch-pulley-damper unit therefore may be designed in a manner that keeps its vibration response range seen by the crankshaft in the range of the crankshaft vibrations, yet ensure the crankshaft is still able to transmit its full drive torque to the torque transfer segment and the motor-generator.

The shape of the polygonal coupling is not limited to a triangular polygon, but instead may have any number of sides, as long as the polygon is modified to induce the desired coupling flexibility as in the triangular example. Moreover, the present invention is not limited to any particular shape (e.g., oval, dog-bone), as long as the vibration-absorbing portions of the shape permit the coupling to absorb circumferential vibrations while still maintaining the ability to transfer torque output from the crankshaft to the torque transfer segment, as would a splined coupling.

An additional factor to consider in the design of the present invention is the ratio of torsional strength to torsional stiffness of the coupling. The torsional stiffness of the coupling is reduced with decreasing stiffness of the portions of the coupling at the corners of the polygon, which allows the corners to slightly flex in response to angular vibration pulses, for example by including transverse breaks in portions of the coupling that are radially adjacent to circumferentially-oriented recesses at each apex, thereby forming separate circumferentially-oriented "arms" that can independently flex. Similarly, the ratio of torsional flexibility to torsional strength may be increased by omitting such breaks, resulting in a solid "bridge" section between a recess and the axial face of the coupling part. The result is a stiffer, but to an even greater degree stronger, arrangement that increases the ratio of torsional strength to torsional stiffness. The torsional strength/weight ratio may also be altered by altering the relative sizes of the circumferentially-aligned recesses relative to the thickness of the radially adjacent portions.

Regardless of the specific approach taken, it is desirable to have the ratio of torsional strength to torsional stiffness to be optimized for the application, particularly where the resonant frequency is to be kept as low as possible.

A further aspect of the present invention is the opportunity to provide increased vibration damping in the coupling, by including a damping medium in the recesses. A small amount of damping is provided inherently by the coupling material's elasticity (i.e., a small amount of energy dissipation in the form of heat generated by friction between components and hysteresis of the material as it is compressed and tensioned in response to vibrations). This damping may be significantly increased by the additional of a damping medium in the coupling recesses, particularly in embodiments in which the arms are separated and thus capable of greater relative movement. Suitable damping materials include an elastomer, wax, a sponge-like material and/or another material capable of dissipating kinetic energy generated by relative movements in response to angular vibrations.

The polygonal coupling of the present invention is not limited to use in front end motor-generator systems, or to applications in which an internal combustion engine is present. The potential applications of the inventive polygonal coupling include any application in which torque is transferred over a rotating coupling, such as between driven and a driving shafts. Such applications include various industrial applications, such as torque transfer to and/or from an electric motor, a compressor, a pump, a gear drive, a transmission, and the like. Moreover, the present invention is not limited to internal combustion engine applications, but may be used with any form of power transmission device, such as an electric motor of a vehicle equipped with an electric drive motor.

Other objects, advantages and novel features of the present invention will become apparent from the following detailed description of the invention when considered in conjunction with the accompanying drawings.

BRIEF DESCRIPTION OF THE DRAWINGS

FIGS. 2A-2C are cross-section views of an embodiment of a clutch-pulley-damper and assembled FEMG components in accordance with an embodiment in application Ser. No. 15/378,139.

FIGS. 6A-6B provide a cross-section view of an assembled embodiment of the polygonal coupling of the present invention.

DETAILED DESCRIPTION OF THE DRAWINGS

Figure 1A:
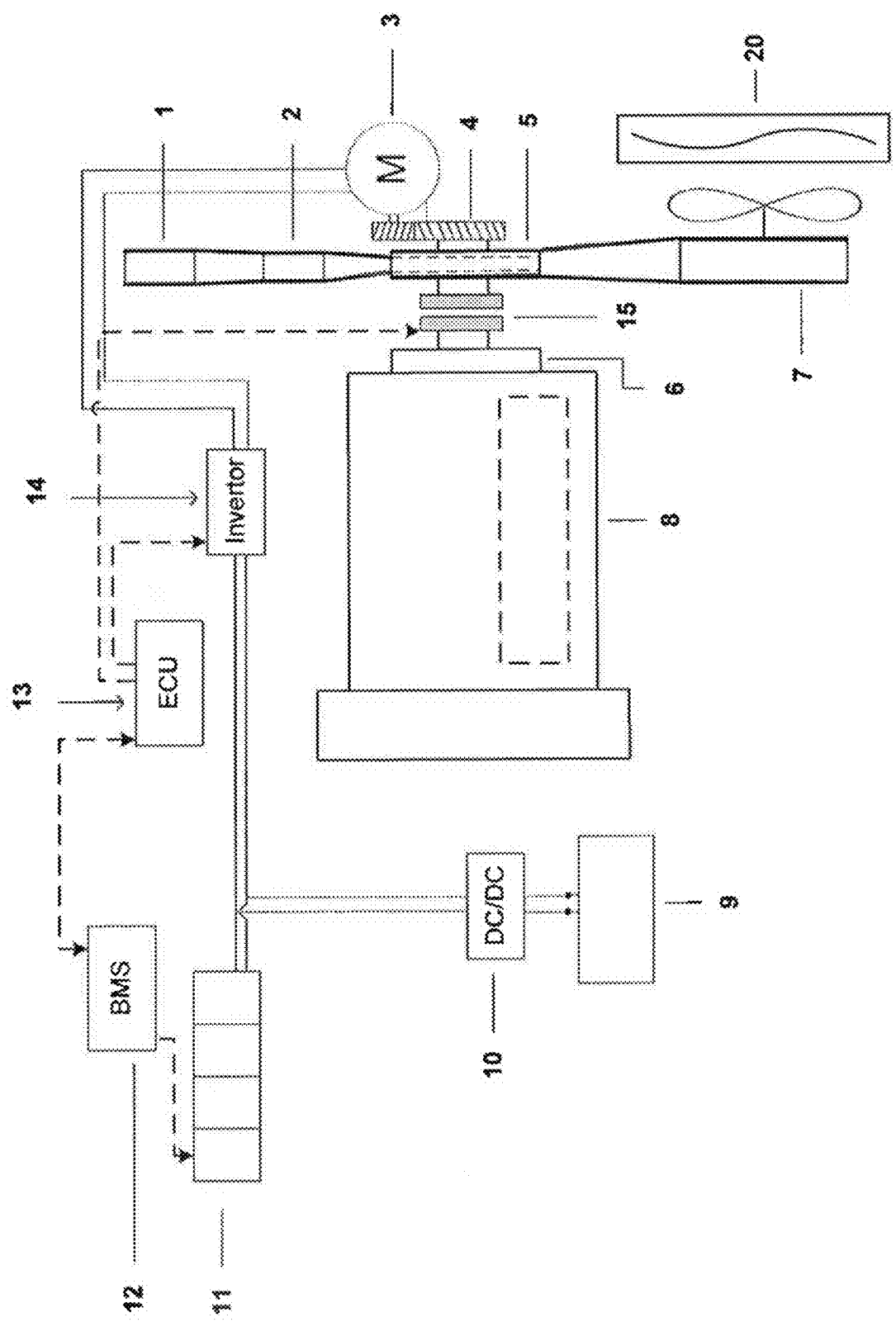
FIGS. 1A and 1B are schematic illustrations of an overall view of the arrangements of an FEMG system in accordance with an embodiment in application Ser. No. 15/378,139.
Figure 1B:
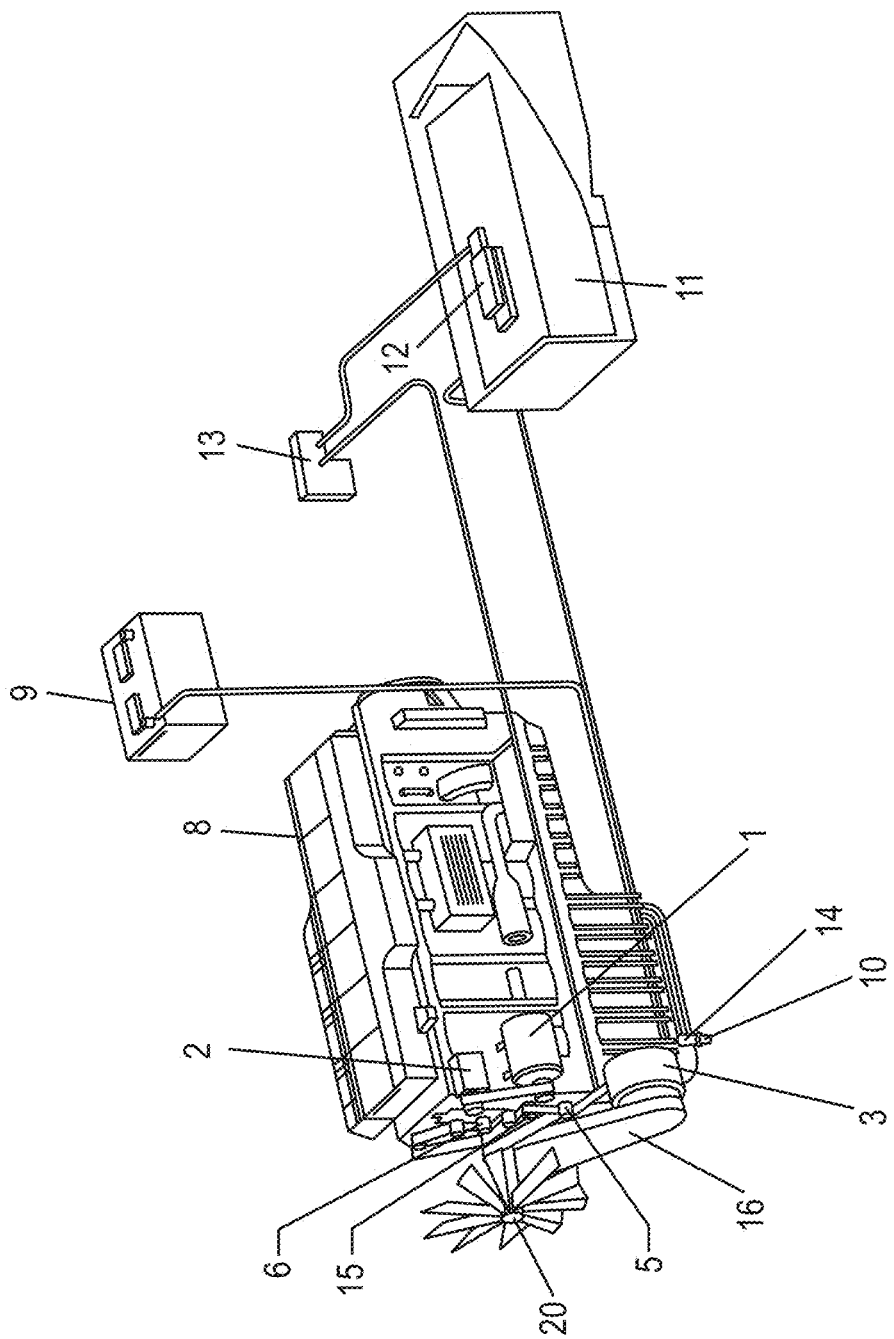

FIG. 1A is a schematic illustration showing components of an embodiment of an FEMG system as in application Ser. No. 15/378,139. FIG. 1B is a schematic illustration of several of the FEMG system components in the chassis of a commercial vehicle. In this arrangement, the engine accessories (including air compressor 1, air conditioning compressor 2 and engine cooling fan 7 arranged to pull cooling air through engine coolant radiator 20) are belt-driven from a pulley 5. The pulley 5 is located co-axially with a damper 6 coupled directly to the crankshaft of the internal combustion engine 8. The accessories may be directly driven by the drive belt or provided with their own on/off or variable-speed clutches (not illustrated) which permit partial or total disengagement of an individually clutch-equipped accessory from the belt drive.

In addition to driving the accessory drive belt, the pulley 5 is coupled a drive unit having reduction gears 4 to transfer torque between a crankshaft end of the drive unit and an opposite end which is coupled to a motor-generator 3 (the drive unit housing is not illustrated in this figure for clarity). A disengageable coupling in the form of a clutch 15 is arranged between the crankshaft damper 6 and the pulley 5 (and hence the drive unit and the motor-generator 3). Although schematically illustrated as axially-separate components for clarity in FIG. 1A, in this embodiment the crankshaft 6, clutch 15 and pulley 5 axially overlap one another at least partially, thereby minimizing an axial depth of the combined pulley-clutch-damper unit in front of the engine. Actuation of the pulley-clutch-damper clutch 15 between its engaged and disengaged states is controlled by an electronic control unit (ECU) 13.

On the electrical side of the motor-generator 3, the motor-generator is electrically connected to a power invertor 14 which converts alternating current (AC) generated by the motor-generator output to direct current (DC) useable in an energy storage and distribution system. The power invertor 14 likewise in the reverse direction converts direct current from the energy storage and distribution system to alternating current input to power the motor-generator 3 as a torque-producing electric motor. The inverter 14 is electrically connected to an energy storage unit 11 (hereafter, an "energy store"), which can both receive energy for storage and output energy on an on-demand basis.

In this embodiment, the energy store 11 contains Lithium-based storage cells having a nominal charged voltage of approximately 3.7 V per cell (operating range of 2.1 V to 4.1 V), connected in series to provide a nominal energy store voltage of 400 volts (operating voltage range of approximately 300 V to 400 volts) with a storage capacity of between approximately 12 and 17 kilowatt-hours of electrical energy. Alternatively, the cells may be connected in series and parallel as needed to suit the application. For example, 28 modules with four series-connected cells per module could be connected in series and in parallel to provide an energy store with the same 17 kilowatt hours of stored energy as the first example above, but with a nominal operating voltage of 200 V volts and twice the current output of the first example.

In addition to the relatively high-capacity, low charge-discharge rate Lithium-based storage cells, the energy store 11 in this embodiment includes a number of relatively low-capacity, high charge-discharge rate of super capacitors to provide the energy store the ability over short periods to receive and/or discharge very large electrical currents that could not be handled by the Lithium-based storage cells (such cells being typically limited to charge/discharge rates of less than 1 C to only a few C).

Figure 2B:
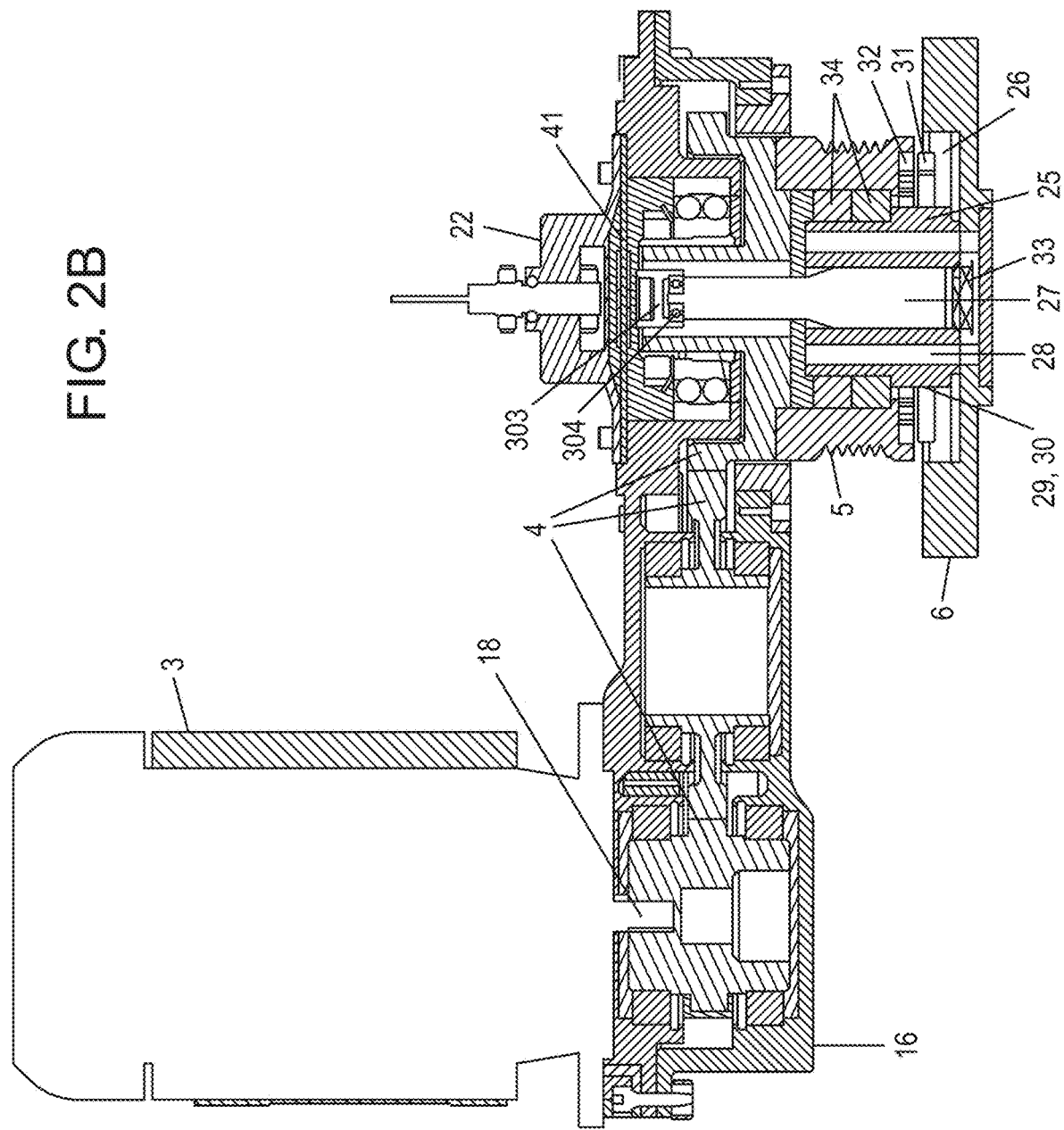
Figure 2C:
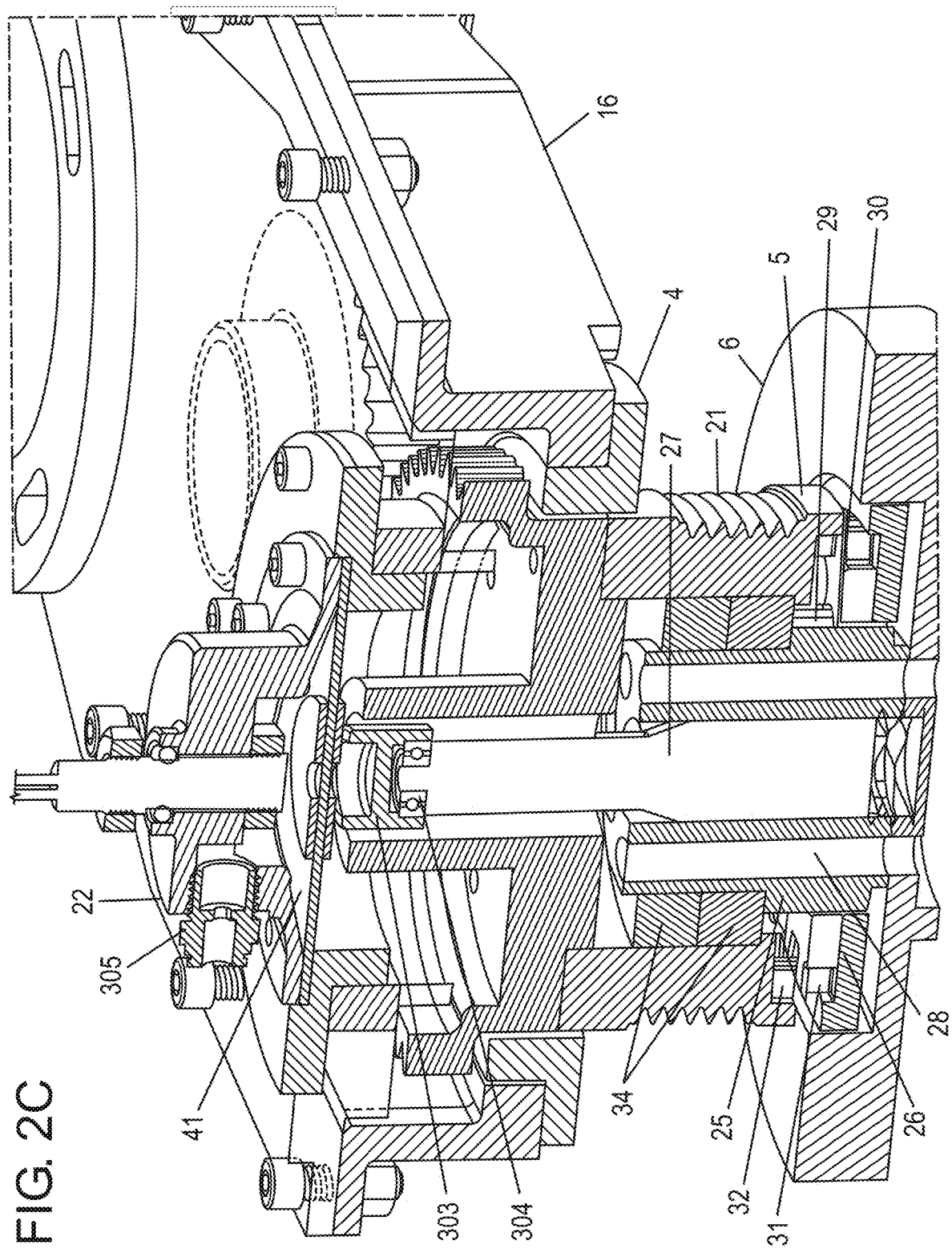

FIGS. 2A-2C show cross-section views of an embodiment in application Ser. No. 15/378,139 of the clutch-pulley-damper unit 19 and of an assembled configuration of FEMG system hardware with this clutch-pulley-damper embodiment. In this embodiment the gearbox 16 containing reduction gears 4 receives the motor-generator 3 at a motor-generator end of the gearbox. The motor-generator 3 is secured to the housing of gearbox 16 with fasteners such as bolts (not illustrated). A rotor shaft 18 of the motor-generator 3 engages a corresponding central bore of the adjacent co-axially-located gear of the reduction gears 4 to permit transfer of torque between the motor-generator 3 and the reduction gears 4.

At the crankshaft end of the gearbox 16, the reduction gear 4 which is co-axially-aligned with the clutch-pulley-damper unit 19 is coupled for co-rotation to pulley side of the clutch-pulley-damper unit 19, in this embodiment by bolts (not shown) passing through the co-axial reduction gear 4. The engine-side portion of the coupling (the portion having the crankshaft damper 6) is configured to be coupled to the front end of the engine crankshaft by fasteners or other suitable connections that ensure co-rotation of the engine-side portion 6 with the crankshaft. As described further below, the gearbox 16 is separately mounted to a structure that maintains the clutch-pulley-damper unit 19 co-axially aligned with the front end of the engine crankshaft.

The cross-section view in FIG. 2B is a view from above the FEMG front end hardware, and the oblique cross-section view in FIG. 2C is a view at the crankshaft end of the gearbox 16. In this embodiment, the gearbox, motor-generator and clutch-pulley-damper unit assembly is arranged with the motor-generator 3 being located on the left side of the engine crankshaft and on the front side of the gearbox 16 (the side away from the front of the engine), where the motor-generator 3 may be located either in a space below or directly behind the vehicle's engine coolant radiator 20. Alternatively, in order to accommodate different vehicle arrangements the gearbox 16 may be mounted with the motor-generator 3 to the rear of the gearbox 16, preferably in a space laterally to the left side of the engine crankshaft (for example, adjacent to the oil pan at the bottom of the engine). The gearbox 16 further may be provided with dual-sided motor-generator mounting features, such that a common gearbox design may be used both in vehicle applications with a front-mounted motor-generator and vehicle applications with the motor-generator mounted to the rear side of the gearbox.

Figure 3A:
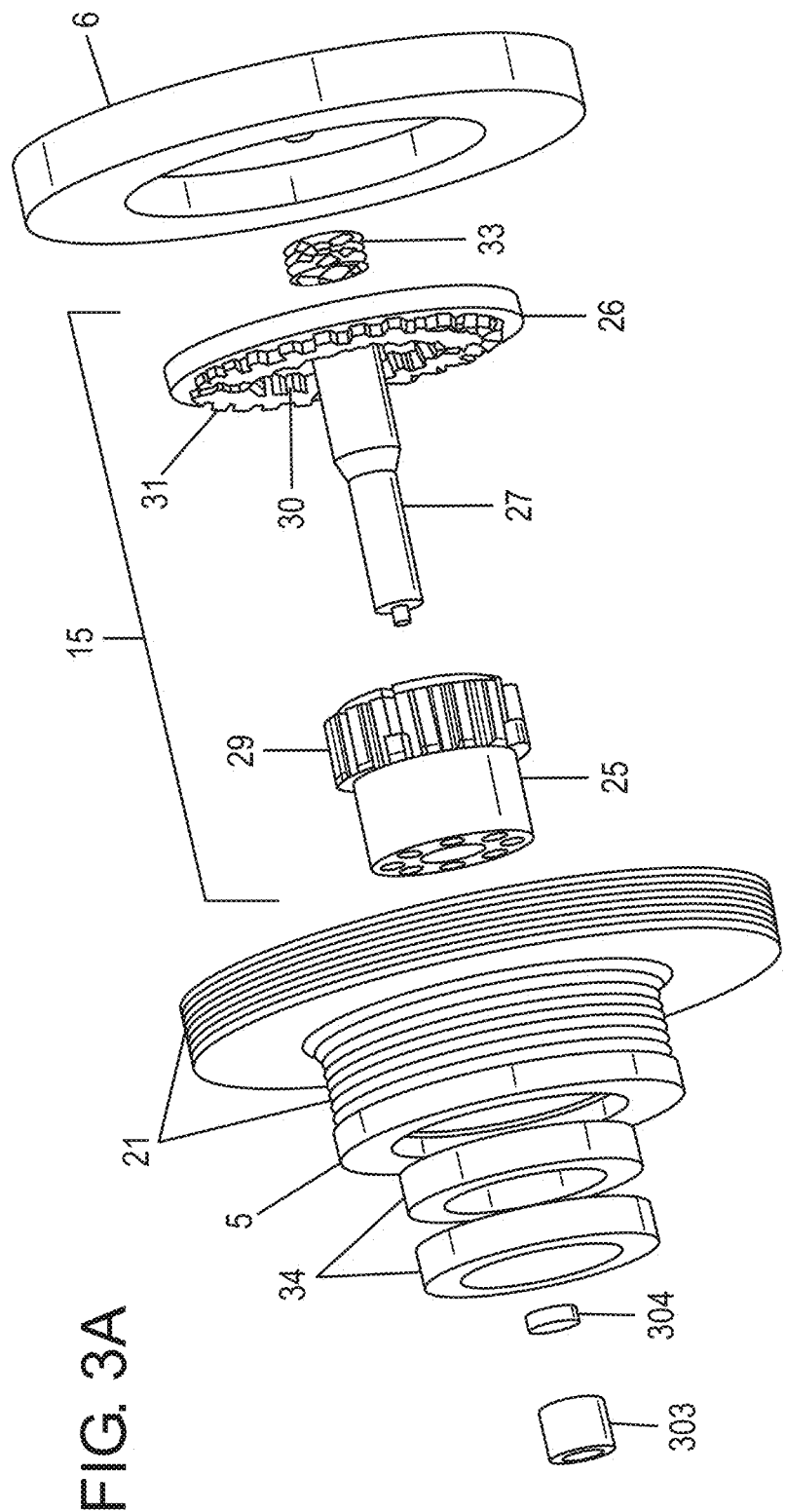
FIGS. 3A-3C are views of the components of the FIGS. 2A-2C clutch-pulley-damper unit.
Figure 3B:
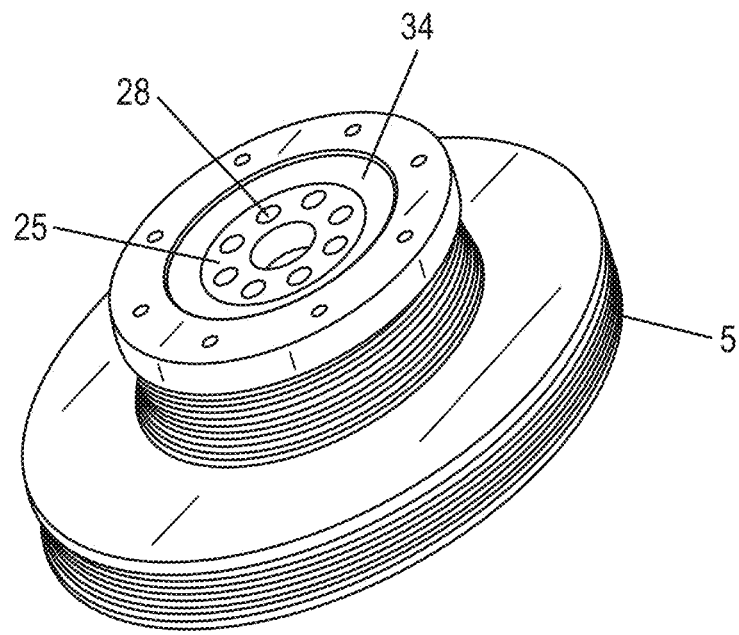
Figure 3C:
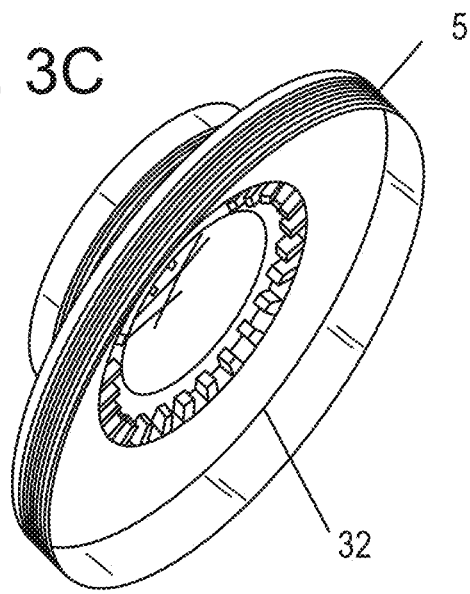

FIGS. 3A-3C are views of the components of the clutch-pulley-damper unit 19 of FIGS. 2A-2C. When assembled, the unit is unusually narrow in the axial direction due to the substantial axial overlapping of the pulley 5, engine-side portion 6 (hereafter, damper 6) and clutch 15. In this embodiment the pulley 5 has two belt drive portions 21 configured to drive accessory drive belts (not illustrated), for example, one portion arranged to drive the engine cooling fan 7 surrounding the clutch 15, and another portion arranged to drive other engine accessories such as the air compressor 1. The drive belt portions 21 in this example concentrically surround the damper 6 and the clutch 15 (the belt drive portion 21 surrounding the damper 6 is omitted in FIGS. 2B and 2C for clarity).

Within the clutch-pulley-damper unit 19 the clutch 15 includes two axially-engaging dog clutch elements 25, 26. As shown in the FIGS. 2A-2C cross-section views, the central core dog clutch element 25 is fixed for rotation with the damper 6, in this embodiment by bolts extending through axial bolt holes 28 from the FEMG gearbox side of the clutch-pulley-damper unit 19. The pulley 5 is rotationally supported on the central core element 25 by bearings 34.

An engine-side portion of the outer circumference of the central core dog clutch element 25 includes external splines 29 arranged to engage corresponding internal splines 30 at an inner circumference of the axially-movable dog clutch element 26. The external splines 29 and internal splines 30 are in constant engagement, such that the movable dog clutch element 26 rotates with the damper 6 while being movable axially along the damper rotation axis.

The movable dog clutch element 26 is also provided with axially forward-facing dogs 31 distributed circumferentially about the gearbox side of the element 26 (the side facing away from the engine). These dogs 31 are configured to engage spaces between corresponding dogs 32 on an engine-facing side of the pulley 5, as shown in FIG. 3C. The movable dog clutch element 26 is biased in the clutch-pulley-damper unit in an engaged position by a spring 33 located between the damper 6 and the movable dog clutch element 26, as shown in FIG. 2A. FIGS. 2B and 2C show the clutch disengaged position, in which the spring 33 is compressed as the movable dog clutch element 26 is axially displaced toward the damper 6.

In this embodiment a clutch throw-out rod 27 is located concentrically within the central core dog clutch element 25. The engine-side end of the throw-out rod 27 is arranged to apply an axial clutch disengagement force that overcomes the bias of spring 33 to axially displace the dog clutch element 26 toward the damper 6, thereby disengaging its forward-facing dogs 31 from the corresponding dogs 32 at the engine-facing side of the pulley 5. In this embodiment, the gearbox end of the clutch throw-out rod 27 is provided with a bushing 303 and a bearing 304 which enables the bushing to remain stationary while the throw-out rod 27 rotates.

The clutch throw-out rod 27 is axially displaced to disengage and engage the dog clutch 15 by a clutch actuator 22. In this embodiment the clutch actuator 22 is pneumatically-actuated, with compressed air entering fitting 305 over clutch actuator diaphragm 41 and thereby urging the center portion of the diaphragm 41 into contact with the throw-out rod bushing 303 to axially displace the clutch throw-out rod 27 toward the engine to disengage the clutch 15. When compressed air pressure is removed from the clutch actuator the diaphragm 41 retracts away from the engine, allowing the biasing spring 33 to axially displace the throw-out rod 27 and the dog clutch element 26 toward the pulley 5 to reengage the clutch dogs 31, 32 so that the pulley 5 co-rotates with the damper 6.

Figure 4A:
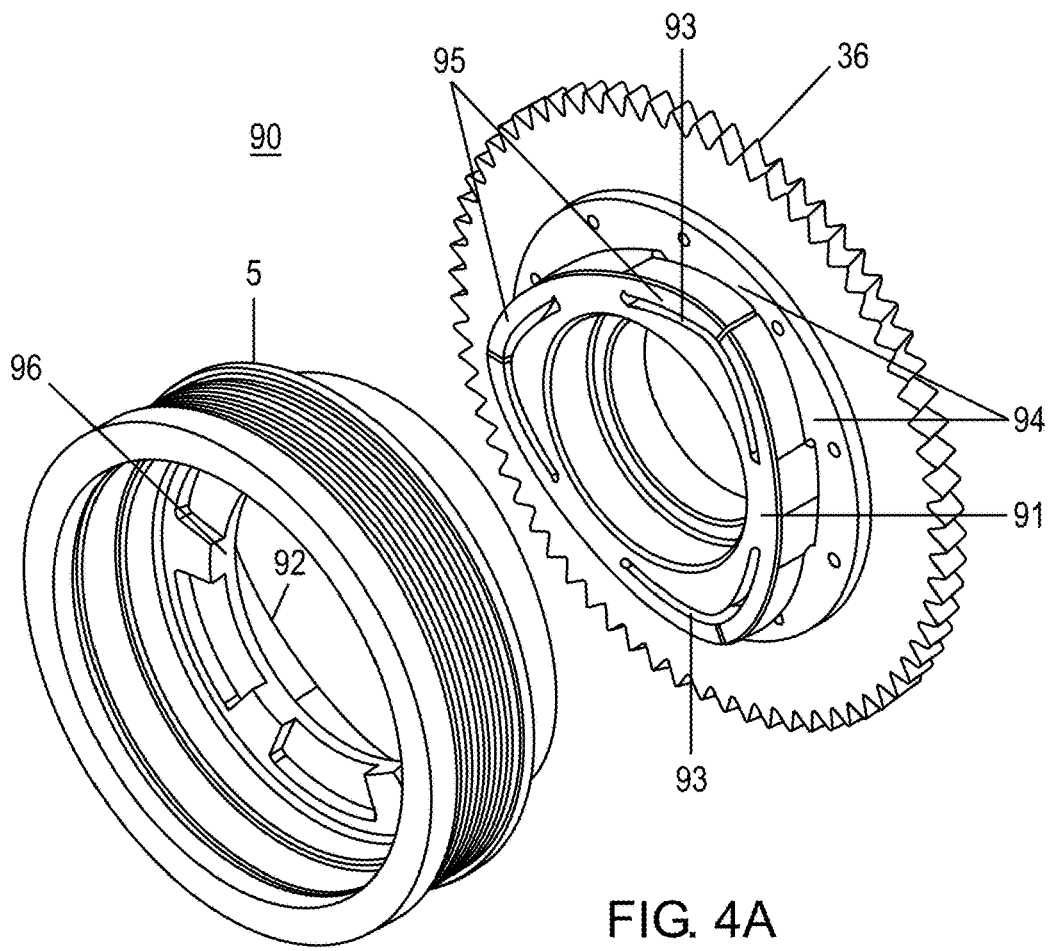
FIGS. 4A-4B are oblique views of components of a polygonal coupling in accordance with an embodiment of the present invention.
Figure 4B:
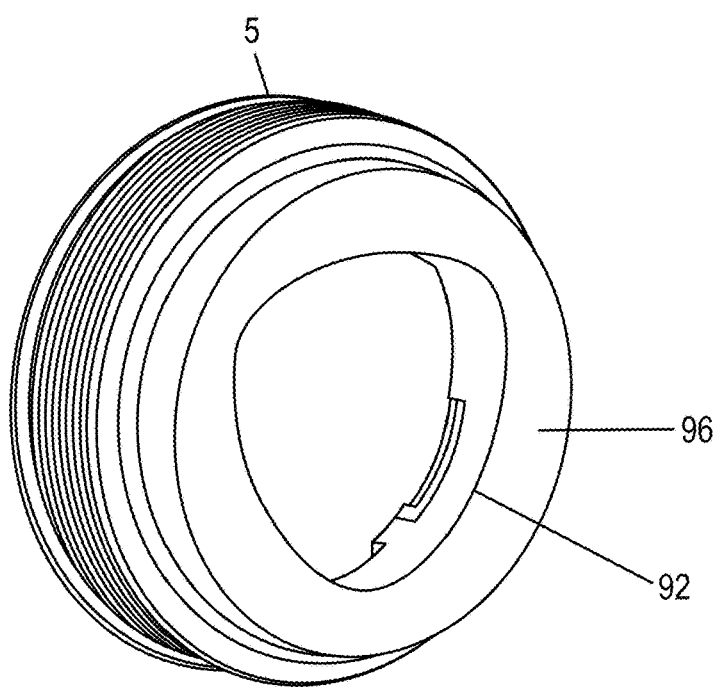

FIGS. 4A and 4B show an embodiment in accordance with the present invention of a polygonal coupling 90 between an input element of the torque transfer segment (pulley-end gear 36) and an output element of the clutch-pulley-damper unit 19 (pulley 5). FIG. 4A illustrates this polygonal coupling embodiment's male portion 91 carried on the gearbox pulley-end gear 36, and a female portion 92 formed in the opposing region 96 of the pulley 5. The locations of the male and female portions may be reversed between the pulley 5 and the gearbox pulley-end gear 36. FIG. 4B is a reverse side view of the pulley 5 in FIG. 4A, showing the face of pulley region 96 that abuts the face of the gearbox pulley-end gear 36 containing the male portion 91.

The polygonal coupling male portion 91 includes a plurality of axially-aligned recesses 93, here arranged at the peaks of the lobes of the male polygon. The material between the recesses 93 and the outer circumference of the male portion 91 is undercut by grooves 94, such that elastically-deflectable arms 95 are formed on the periphery of the polygonal coupling male portion 91. The recesses 93 are arrayed in both directions so that the male portion 91 has engineered flexibility in both the forward and reverse rotation directions.

With this configuration, the present invention permits a small amount of relative rotation between the polygonal coupling male portion 91 and female portion 92, and hence between the pulley-end gear 36 and the pulley 5, while the broad surfaces of the sides of the polygon male and female portions ensure that the coupling can transfer a full torque load between the pulley 5 and the pulley-end gear 36 as the crankshaft rotated. This relative rotation effectively decouples the inertia of the torque transfer segment and the motor-generator from the crankshaft over the relatively small angular displacement of the crankshaft during its vibrations (its micro-accelerations and decelerations), while still maintaining full torque transfer capability across the polygonal coupling.

The recesses 93 in this embodiment are linear slots, which are relatively easy to manufacture in a simple milling operation. However, the recesses are not limited to this shape. For example, the recesses may be curved, and may have other features such as a broad circular end that reduces local stresses and the potential for crack development over a large number flexing cycles of the arms 95. Similarly, the shape and width of the grooves 94 which separate the arms 95 from the face of the pulley-end gear 36 may vary in shape, height and depth as desired to suit a particular application. Such variations of the recesses 93 and grooves 94 are permissible as long as the configuration of the polygonal coupling 90 is such that the arms 95 are capable of enduring a large number of flexing cycles over the design life of the polygonal coupling, and the recesses and grooves are sized to provide a degree of flexibility that permits the clutch-pulley-damper unit 19 to present a desired degree of torsional stiffness to the engine crankshaft.

The material of the polygonal coupling may be selected based on the amount of torque to be transferred across the coupling, the size of the polygonal coupling components, the temperature in the operating environment, etc. For example, in high torque applications and/or in applications in which the male and female polygonal coupling portions are small (thus increasing the local stresses at the mating surfaces of the male and female portions), a high-strength material such as steel may be used to ensure sufficient longevity of the coupling. Alternatively, in lower torque loading and/or local stress applications in lower-temperature environments, other materials such as plastic or rubber coupling portions may be used. Further, mixtures of materials are possible. For example, one of the male or female components may be designed as a sacrificial portion, so that in the event of overloading of the polygonal coupling only the sacrificial side of the coupling is damaged.

Figure 5:
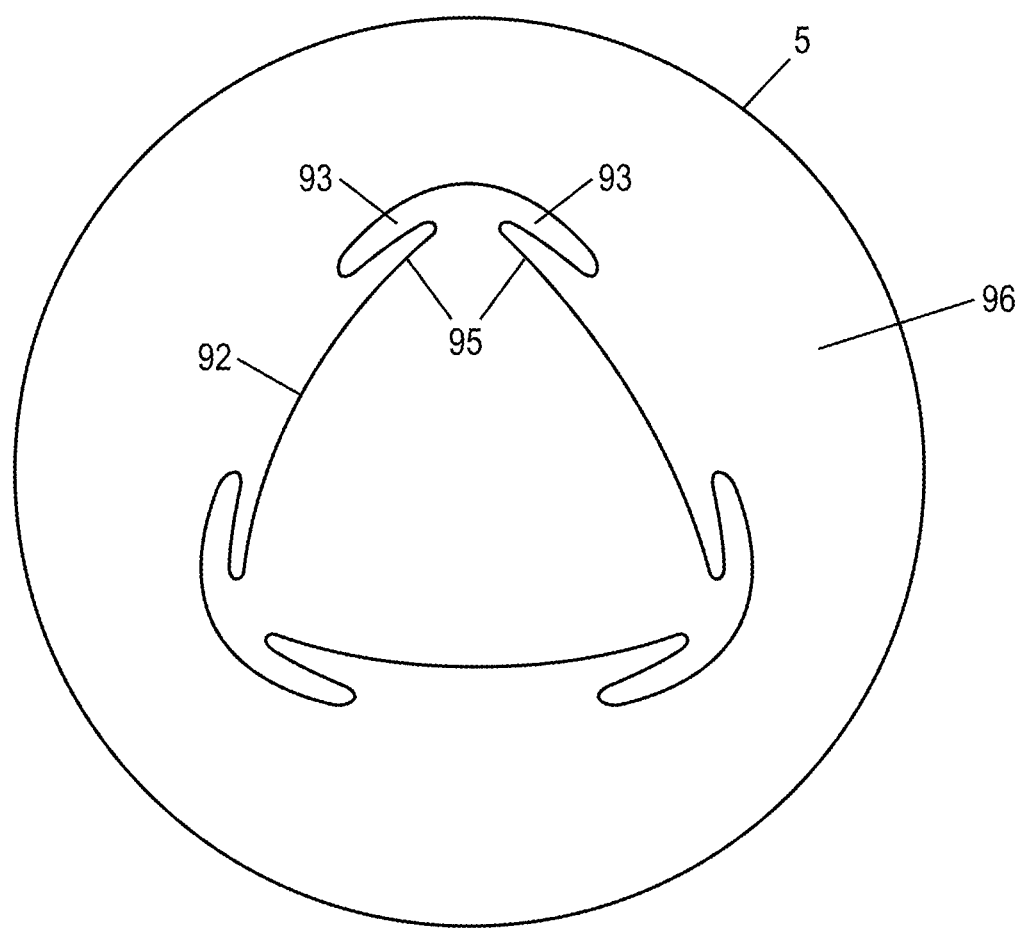
FIG. 5 is an oblique view of a component of a polygonal coupling in accordance with another embodiment of the present invention.

In a further embodiment of the present invention schematically illustrated in FIG. 5, the recesses 93 and arms 95 are provided on the female portion of the coupling, positioned such that the arms 95 may be elastically deformed outwards by the corners of the male polygon to accommodate the desired small amount of relative rotation between the pulley 5 and the torque transfer segment gear 36 (which may have a solid male portion of the coupling). As in the embodiment in FIG. 4, the recesses 93 must be sized and configured to endure a large number of flexing cycles over the design life of the polygonal coupling, while providing a degree of flexibility that permits the clutch-pulley-damper unit 19 to present a desired degree of torsional stiffness to the engine crankshaft.

FIG. 6B presents a cross-section view of an embodiment of a polygonal coupling as in FIG. 4A in an assembled state, taken along section line A-A in FIG. 6A. In this view the male portion 91 of the gearbox pulley-end gear 36 is inserted into, and axially overlapped by, the female portion 92 in the region 96 of the pulley 5. In this state, engine crankshaft micro-accelerations/decelerations may be substantially absorbed by the resilient arms 95 of the male portion 91 as the female portion 92 oscillates about the axis of rotation in response to the crankshaft's motions.

Figure 7:
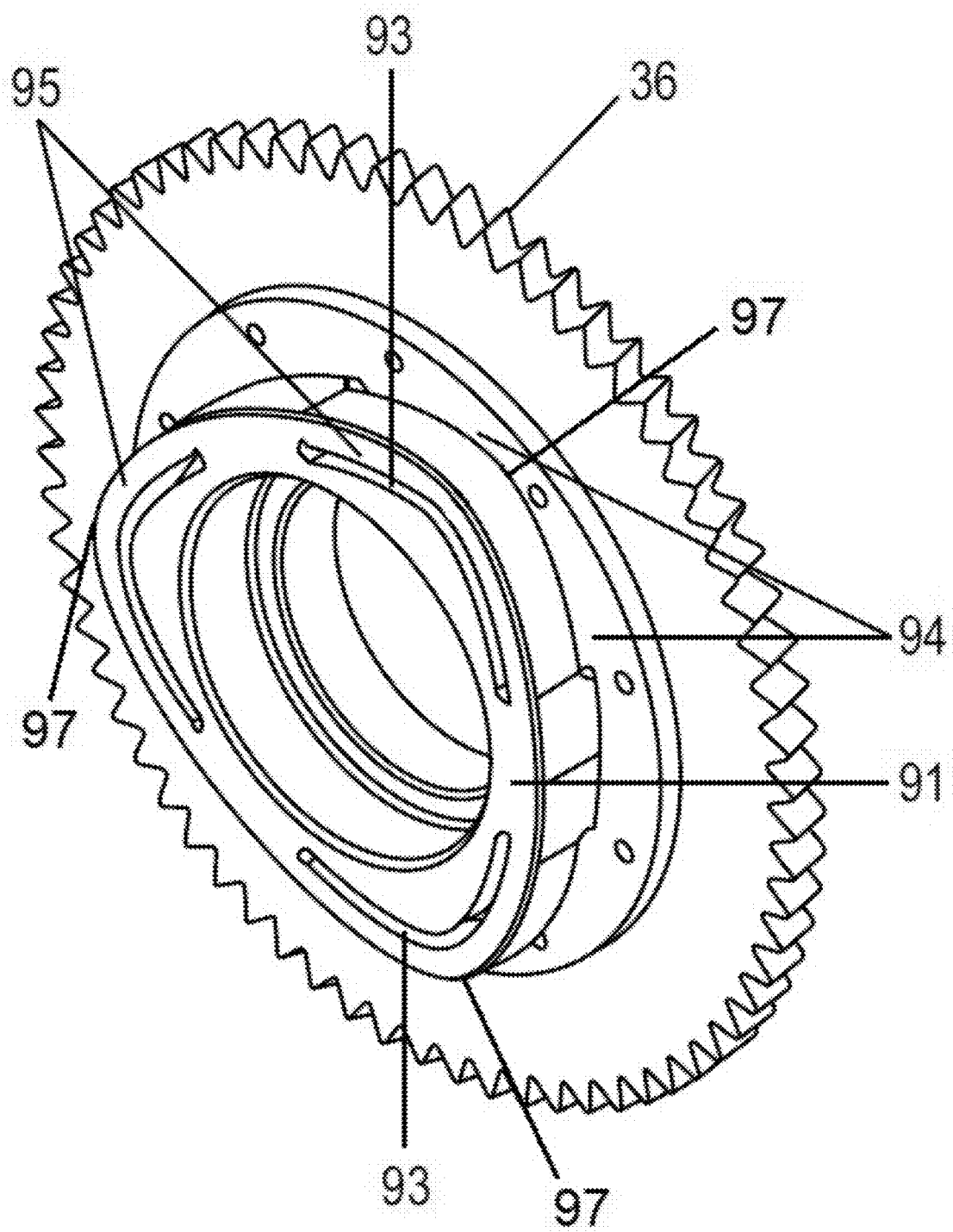
FIG. 7 is an oblique view of another embodiment of a polygonal coupling in accordance with the present invention.

FIG. 7 shows a portion of a coupling embodiment in which the torsional stiffness of the coupling is increased relative to a coupling such as that shown in FIG. 4A by not creating a slot between the arms 95 that are radially outward of the recesses 93, but instead maintaining the respective pairs of arms 95 together at their apex 97 to form a more rotationally strong and stiff structure. The length and radial width of the arms may be increased or decreased relative to one another and/or in absolute size, as necessary to obtained a desired amount of torsional strength and stiffness.

Figure 8:
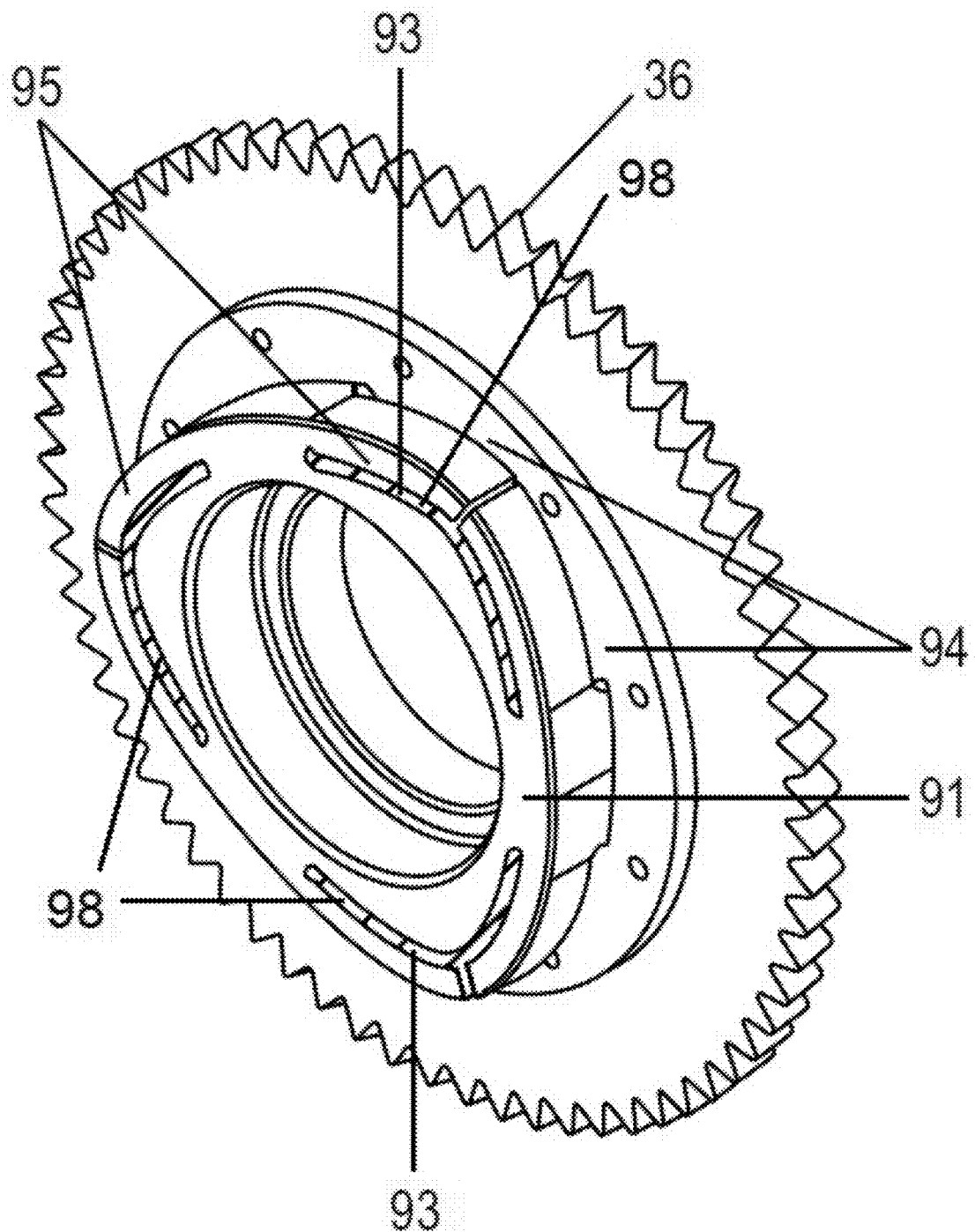
FIG. 8 is an oblique view of an embodiment of the present invention with a damping material integrated therein.

FIG. 8 shows another embodiment of a coupling similar to that shown in FIG. 4A, provided with a damping material 98 in the recesses 93 to provide increased energy dissipation capacity and thereby increase the coupling's ability to dampen movement caused by the engine's crankshaft vibrations.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 air compressor
2 air conditioning compressor
3 motor-generator
4 drive unit gears
pulley
6 damper
7 engine cooling fan
8 engine
9 vehicle batteries
10 DC/DC converter
11 energy store
12 battery management system
13 FEMG electronic control unit
14 AC/DC power inverter
15 clutch
16 gearbox
17 flange shaft
18 rotor shaft
19 clutch-pulley-damper unit
20 engine coolant radiator
21 belt drive portions
22 clutch actuator
23 clutch plates
24 clutch spring
25, 26 dog clutch elements
27 clutch throw-out rod
28 bolt holes
29 external splines
30 internal splines
31, 32 dogs
33 spring
34 bearings
90 polygonal coupling
91 polygonal coupling male portion
92 polygonal coupling female portion
93 recesses
94 grooves
95 arms
96 pulley outside face
97 apex
98 damping medium
303 bushing
304 bearing
305 fitting

What is claimed is:

1. A polygonal coupling, comprising:
an input element configured to transfer torque passing through the coupling segment;
an output element configured to rotate coaxially with the input element,
wherein
one of the input element and the output element includes a polygonal-shaped male portion of the polygonal coupling and the other of the input element and the output element includes a polygonal-shaped female portion of the polygonal coupling,
the female portion of the polygonal coupling is configured to axially overlap the male portion of the polygonal coupling along a rotation axis of the input element,
the female portion is configured to cooperate with the male portion to transfer torque across the polygonal coupling,
at least one of the male and female portions of the polygonal coupling includes a plurality of recesses configured such that elastically flexible arms are formed adjacent to lobes of the polygonal coupling, and
the elastically flexible arms at each lobe are connected to one another adjacent to an apex of the respective lobe, and are configured to be displaced at least one of radially inward and radially outward in a manner permitting rotation of the male and the female portions relative to one another about the rotation axis.

2. The polygonal coupling of claim 1, wherein:
the input element is a rotating element of a component drivable by torque transferred by the output element to the input element.

3. The polygonal coupling of claim 2, wherein
the component is an electric motor, a compressor, a pump, a gear drive or a transmission.

4. The polygonal coupling of claim 3, wherein:
the rotating element is a shaft or a gear.

5. The polygonal coupling of claim 2, wherein:
the component is a torque transfer segment of a hybrid electric front end motor-generator system, and the output element is an output of a clutch-pulley-damper unit of the hybrid electric front end motor-generator system.

6. The polygonal coupling of claim 5, wherein
the input element is a gear of the torque transfer segment, and
the output element is a pulley of the clutch-pulley-damper unit.

7. The polygonal coupling of claim 1, wherein
the male portion is at the input element, and
the female portion is at the output element.

8. The polygonal coupling of claim 1, wherein
the female portion is at the input element, and
the male portion is at the output element.

9. The polygonal coupling of claim 1, wherein
the plurality of recesses are adjacent to the lobes of the male portion.

10. The polygonal coupling of claim 1, wherein
the plurality of recesses are adjacent to the lobes of the female portion.

11. The polygonal coupling of claim 1, wherein
the elastically flexible arms are configured such that the arms change an amount of arm displacement in response to changes in an amount of torque being transferred across the polygonal coupling.

12. The polygonal coupling of claim 11, wherein
the elastically flexible arms are configured such that when the polygonal coupling is coupled to a power transmission device, the elastically flexible arms change the amount of arm displacement in response to changes in an amount of torque being transferred across the polygonal coupling caused by oscillating rotational speed variations of the power transmission device.

13. The polygonal coupling of claim 12, wherein
the power transmission device is an internal combustion engine.

14. The polygonal coupling of claim 13, wherein
the output element is coupled to a crankshaft of the internal combustion engine.

15. A polygonal coupling, comprising:
input means for transfer of torque passing through the coupling segment;
output means for transfer the torque to the input means, the output means being arranged rotate coaxially with the input means,
wherein
one of the input means and the output means includes a first polygonal-shaped torque transfer means and the other of the input means and the output means includes a second polygonal-shaped torque transfer means,
the second torque transfer means axially overlaps the first torque transfer means along a rotation axis of the input means and is arranged to cooperate with the first torque transfer means to transfer torque across the polygonal coupling,
at least one of the first and second torque transfer means includes a plurality of recesses configured such that elastically flexible arms are formed adjacent to lobes of the polygonal torque transfer means, the elastically flexible arms at each lobe being connected to one another adjacent to an apex of the respective lobe, and
the first and second torque transfer means are rotatable relative to one another about the rotation axis.

16. A polygonal coupling, comprising:
an input element configured to transfer torque passing through the coupling segment;
an output element configured to rotate coaxially with the input element,
wherein
one of the input element and the output element includes a polygonal-shaped male portion of the polygonal coupling and the other of the input element and the output element includes a polygonal-shaped female portion of the polygonal coupling,
the female portion of the polygonal coupling is configured to axially overlap the male portion of the polygonal coupling along a rotation axis of the input element,
the female portion is configured to cooperate with the male portion to transfer torque across the polygonal coupling,
at least one of the male and female portions of the polygonal coupling includes a plurality of recesses configured such that elastically flexible arms are formed adjacent to lobes of the polygonal coupling,
the elastically flexible arms are configured to be displaced at least one of radially inward and radially outward in a manner permitting rotation of the male and the female portions relative to one another about the rotation axis, and
a damping material is located in the recesses.

17. The polygonal coupling of claim 16, wherein
the elastically flexible arms at each lobe are connected to one another adjacent to an apex of the respective lobe.

* * * * *